United States Patent
Aragones

(10) Patent No.: US 7,428,478 B2
(45) Date of Patent: Sep. 23, 2008

(54) SYSTEM AND METHOD FOR IMPROVING ACCURACY OF BASELINE MODELS

(75) Inventor: James Kenneth Aragones, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 681 days.

(21) Appl. No.: 10/707,655

(22) Filed: Dec. 30, 2003

(65) Prior Publication Data

US 2004/0172227 A1    Sep. 2, 2004

Related U.S. Application Data

(63) Continuation-in-part of application No. 09/682,314, filed on Aug. 17, 2001.

(51) Int. Cl.
| | |
|---|---|
| G06F 7/60 | (2006.01) |
| G06F 17/10 | (2006.01) |
| G06F 7/48 | (2006.01) |
| G05B 13/02 | (2006.01) |

(52) U.S. Cl. .................. 703/2; 703/7; 701/59; 700/29; 700/30; 707/1; 707/102

(58) Field of Classification Search .................. 703/2, 703/7; 701/59; 700/29, 30; 707/1, 102
See application file for complete search history.

(56) References Cited

U.S. PATENT DOCUMENTS

| | | | |
|---|---|---|---|
| 4,215,412 A | 7/1980 | Bernier et al. | |
| 5,018,069 A * | 5/1991 | Pettigrew | 701/35 |
| 5,050,081 A | 9/1991 | Abbott et al. | |
| 5,075,881 A * | 12/1991 | Blomberg et al. | 703/2 |
| 5,080,458 A | 1/1992 | Hockaday | |
| 5,189,606 A * | 2/1993 | Burns et al. | 705/10 |
| 5,197,127 A | 3/1993 | Waclawsky et al. | |
| 5,408,412 A | 4/1995 | Hogg et al. | |
| 5,687,082 A | 11/1997 | Rizzoni | |
| 5,703,283 A * | 12/1997 | McClish et al. | 73/116 |
| 5,727,128 A * | 3/1998 | Morrison | 706/45 |
| 6,003,808 A | 12/1999 | Nguyen et al. | |
| 6,047,593 A | 4/2000 | Scher et al. | |
| 6,067,486 A | 5/2000 | Aragones et al. | |
| 6,125,312 A | 9/2000 | Nguyen et al. | |

(Continued)

FOREIGN PATENT DOCUMENTS

EP    1146468    10/2001

(Continued)

OTHER PUBLICATIONS

U.S. Appl. No. 10/707,656, Aragones.

(Continued)

Primary Examiner—Paul L Rodriguez
Assistant Examiner—Dwin M Craig
(74) Attorney, Agent, or Firm—Penny A. Clarke

(57) ABSTRACT

System, method and computer-readable medium for baseline modeling a product or process. A service database contains process data. A preprocessor processes the data into a predetermined format. A baseline modeling component builds a baseline model from the preprocessed data, wherein the baseline model relates process performance variables as a function of process operating conditions.

35 Claims, 7 Drawing Sheets

U.S. PATENT DOCUMENTS

| | | | |
|---|---|---|---|
| 6,151,582 | A | 11/2000 | Huang et al. |
| 6,216,066 | B1 | 4/2001 | Goebel et al. |
| 6,223,143 | B1 | 4/2001 | Weinstock et al. |
| 6,243,696 | B1 | 6/2001 | Keeler et al. |
| 6,317,654 | B1 | 11/2001 | Gleeson et al. |
| 6,408,259 | B1 | 6/2002 | Goebel et al. |
| 6,473,677 | B1 | 10/2002 | Hershey et al. |
| 6,487,479 | B1 | 11/2002 | Nelson |
| 6,487,490 | B1 | 11/2002 | Kamath et al. |
| 6,519,575 | B1 | 2/2003 | Goebel |
| 6,591,182 | B1 | 7/2003 | Cece et al. |
| 6,601,015 | B1 | 7/2003 | Milvert et al. |
| 6,606,580 | B1 | 8/2003 | Zedda et al. |
| 6,631,384 | B1 | 10/2003 | Richman et al. |
| 6,799,154 | B1 | 9/2004 | Aragones et al. |
| 6,832,205 | B1 | 12/2004 | Aragones et al. |
| 7,031,878 | B2 | 4/2006 | Cuddihy et al. |
| 7,039,554 | B2 * | 5/2006 | Nguyen et al. ............... 702/183 |
| 2001/0032109 | A1 | 10/2001 | Gonyea et al. |
| 2002/0173897 | A1 | 11/2002 | Leamy et al. |
| 2003/0034995 | A1 | 2/2003 | Osborn et al. |
| 2003/0036891 | A1 | 2/2003 | Aragones et al. |
| 2003/0045992 | A1 | 3/2003 | Humerickhouse et al. |
| 2004/0172228 | A1 | 9/2004 | Aragones |

FOREIGN PATENT DOCUMENTS

| | | |
|---|---|---|
| EP | 1160712 | 12/2001 |

OTHER PUBLICATIONS

U.S. Appl. No. 10/707,657, Aragones.

"Multiple Regression," http://www2.chass.nscu.edu/garson/pa765/regress.htm, pp. 1-27 (printed Oct. 22, 2003).

"Introduction to Regression Analysis," http://www.nlreg.com/intro.htm, pp. 1-3 (printed Oct. 22, 2003).

R. A. Johnson et al., "Multivariate Linear Regression Models," Applied Multivariate Statistical Analysis, Chapter 7, 1988, pp. 273-339.

B. Curtis et al., "Process Modeling," Association for Computing Machinery, Communications of the ACM, Sep. 1992, pp. 75-90.

M. A. Schuldt et al., "Alternative Approaches to Baseline Estimation Using Calibrated Simulations," ASHRAE Transactions, 1998, pp. 871-879.

* cited by examiner

SYSTEM AND METHOD FOR IMPROVING ACCURACY OF BASELINE MODELS

CROSS REFERENCE TO RELATED APPLICATIONS

The present application is a continuation-in-part of co-pending U.S. patent application Ser. No. 09/682,314, filed on Aug. 17, 2001, the entirety of which is incorporated by reference herein.

BACKGROUND OF THE INVENTION

The present invention relates generally to systems and methods for improving the quality and productivity of a product or process and more particularly to baseline modeling of a product or process.

Baseline modeling of a product or process generally provides an understanding of the performance of an ideal product or process over time. An engine is one type of product or process that baseline modeling is suitable for use. Engine baseline modeling has a multitude of uses including, but not limited to, determining when an engine performs out of specification, predicting when an engine failure will occur, detecting abnormal conditions, determining the quality of an engine and designing new engines. Typically, engine baseline models are developed from data gathered from thermodynamic cycle analyses and simulation. First, models of ideal values are created and indexed by variables such as altitude, temperature, power setting, and air speed. Once data from the normal operation of the engine is available, these models are updated by analyzing data corresponding to a particular model characteristic. An engineer then looks for data that are similar for the specified engine variables (e.g., altitude, temperature, power setting, air speed), groups the similar data, averages them for each variable and performs other operations as desired. The engineer then plots data for each of the variables. The plots provide interrelationship information between each of the engine variables, which the engineer uses to create tables of typical operation parameters the baseline model. These tables of parameters are used as the basis of comparison for engine operation. Differences from the baseline model may indicate engine faults or deterioration trends.

There are several problems associated with this type of engine baseline modeling. First, this type of engine baseline modeling is very labor intensive because the engineer has to review the data, find data that are similar, group and average the data, perform other desired operations on the data, plot the data and create tables. Another problem is that one engineer cannot readily reproduce an engine baseline model developed by another engineer because this process is very individualized. It is helpful if one engineer can reproduce the engine baseline model generated by another engineer to validate quality of the baseline. Another problem associated with this type of engine baseline model is that the resulting model does not provide a good picture of an engine operating outside normal conditions. Furthermore, this type of engine baseline modeling does not provide a measure of how good the developed model is.

Accordingly, there is a need in the art of statistical modeling for an automated approach to engine baseline modeling that standardizes the process to improve reliability by minimizing human interventions.

BRIEF SUMMARY OF THE INVENTION

The present invention overcomes the problems noted above, and provides additional advantages, by providing a system, method and computer readable medium that stores instructions for instructing a computer system, to perform engine baseline modeling. In one embodiment of the present invention, an engine service database contains engine data, wherein the engine data includes at least time-varying engine data. A preprocessor for processing the engine data into a predetermined format. An engine baseline modeling component builds an initial engine baseline model from the preprocessed data using a regression analysis, wherein the regression analysis relates engine performance variables as a function of engine operating conditions. The engine baseline modeling component then applies a smoothing algorithm to the initial engine baseline model to reduce effects of the time-varying engine data and generate a detrended engine baseline model.

In a second aspect of this disclosure, there is a system, method and computer readable medium that stores instructions for instructing a computer system, to perform engine baseline modeling. In this embodiment, an engine service database contains engine data. A preprocessor processes the engine data into a predetermined format, wherein the preprocessor comprises a data segmenting component that segments the engine data into a plurality of groups. An engine baseline modeling component builds an initial engine baseline model from the preprocessed data using a regression analysis, wherein the regression analysis relates engine performance variables as a function of engine operating conditions. The engine baseline modeling component identifies correlated groups of engine data based upon the initial engine baseline model and combines data from correlated groups. The engine baseline modeling component then builds a final engine baseline model from the combined data using a regression analysis.

In a third aspect of this disclosure, there is a system, method and computer readable medium that stores instructions for instructing a computer system, to perform engine baseline modeling of an aircraft engine. In this embodiment, an engine service database contains aircraft engine data. A preprocessor processes the engine data into a predetermined format, wherein the preprocessor comprises a data segmenting component that segments the engine data into a plurality of groups. An engine baseline modeling component that builds an initial engine baseline model from the preprocessed data using a regression analysis, the initial engine baseline model represented by a plurality of parameter estimates, wherein the regression analysis relates engine performance variables as a function of engine operating conditions. The engine baseline modeling component then identifies segments relating to related engines and averages the parameter estimates for each of the identified related engine segments. The engine baseline modeling component then builds a final engine baseline model from the averaged data using a regression analysis.

BRIEF DESCRIPTION OF DRAWINGS

The present invention can be understood more completely by reading the following Detailed Description of Preferred Embodiments, in conjunction with the accompanying drawings.

DETAILED DESCRIPTION OF THE PREFERRED EMBODIMENTS

Figure 1:
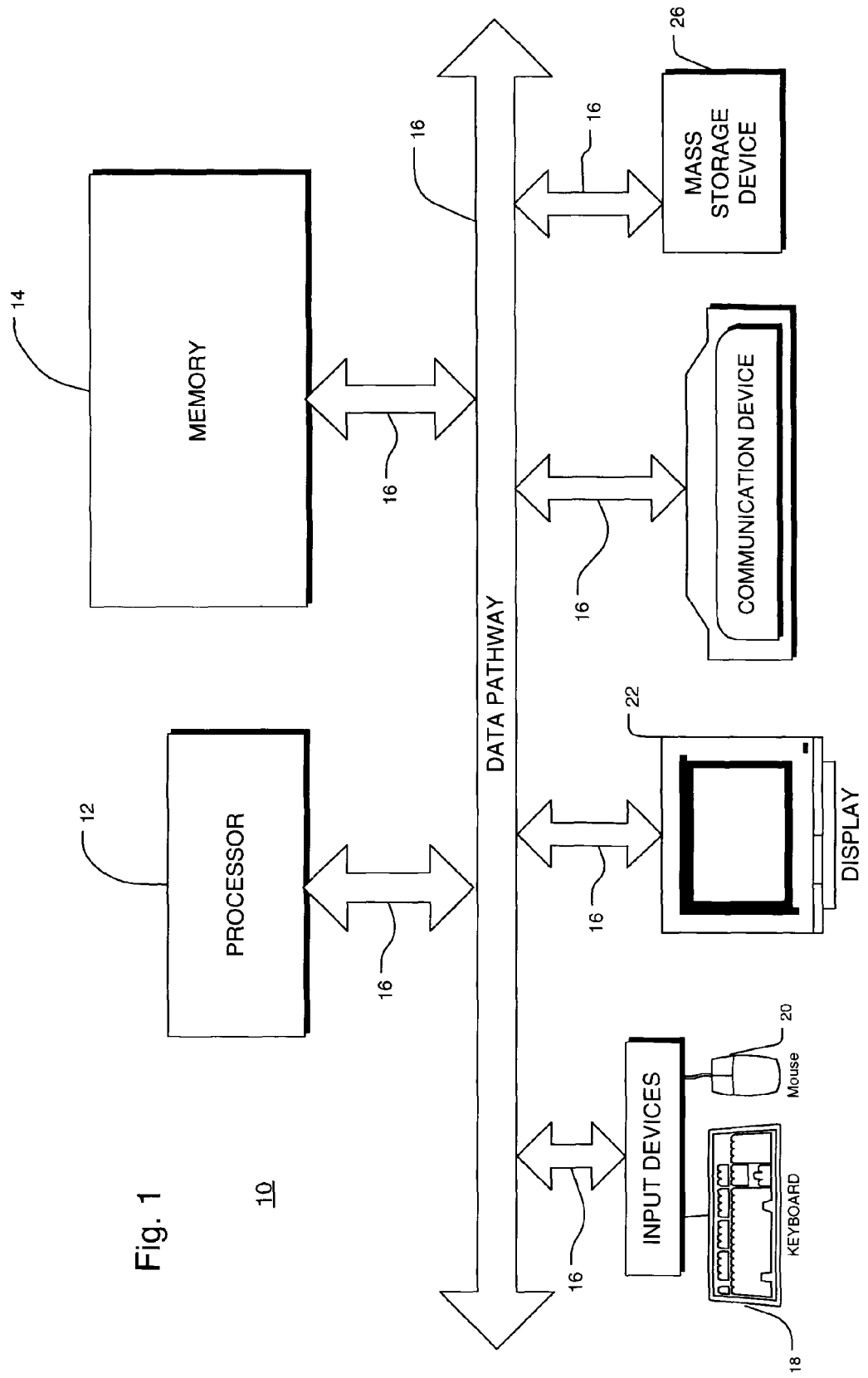
FIG. 1 shows a schematic diagram of a general-purpose computer system in which a system for performing engine baseline modeling operates.

This disclosure describes a system, method and computer product for baseline modeling of a product or process such as an aircraft engine, however, the disclosure is applicable to any type of product or process where it is desirable to model performance. FIG. 1 shows a schematic diagram of a general-purpose computer system in which a system for performing engine baseline modeling operates. The computer system 10 generally comprises a processor 12, memory 14, input/output devices, and data pathways (e.g., buses) 16 connecting the processor, memory and input/output devices. The processor 12 accepts instructions and data from memory 14 and performs various operations. The processor 12 includes an arithmetic logic unit (ALU) that performs arithmetic and logical operations and a control unit that extracts instructions from memory 14 and decodes and executes them, calling on the ALU when necessary. The memory 14 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, memory 14 preferably contains an operating system, which executes on the processor 12. The operating system performs basic tasks that include recognizing input, sending output to output devices, keeping track of files and directories and controlling various peripheral devices.

The input/output devices may comprise a keyboard 18 and a mouse 20 that enter data and instructions into the computer system 10. Also, a display 22 may be used to allow a user to see what the computer has accomplished. Other output devices may include a printer, plotter, synthesizer and speakers. A communication device 24 such as a telephone or cable modem or a network card such as an Ethernet adapter, local area network (LAN) adapter, integrated services digital network (ISDN) adapter, Digital Subscriber Line (DSL) adapter or wireless access card, enables the computer system 10 to access other computers and resources on a network such as a LAN, wireless LAN or wide area network (WAN). A mass storage device 26 may be used to allow the computer system 10 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 10 can take the form of a hand-held digital computer, personal digital assistant computer, notebook computer, personal computer, workstation, mini-computer, mainframe computer or supercomputer.

Figure 2:
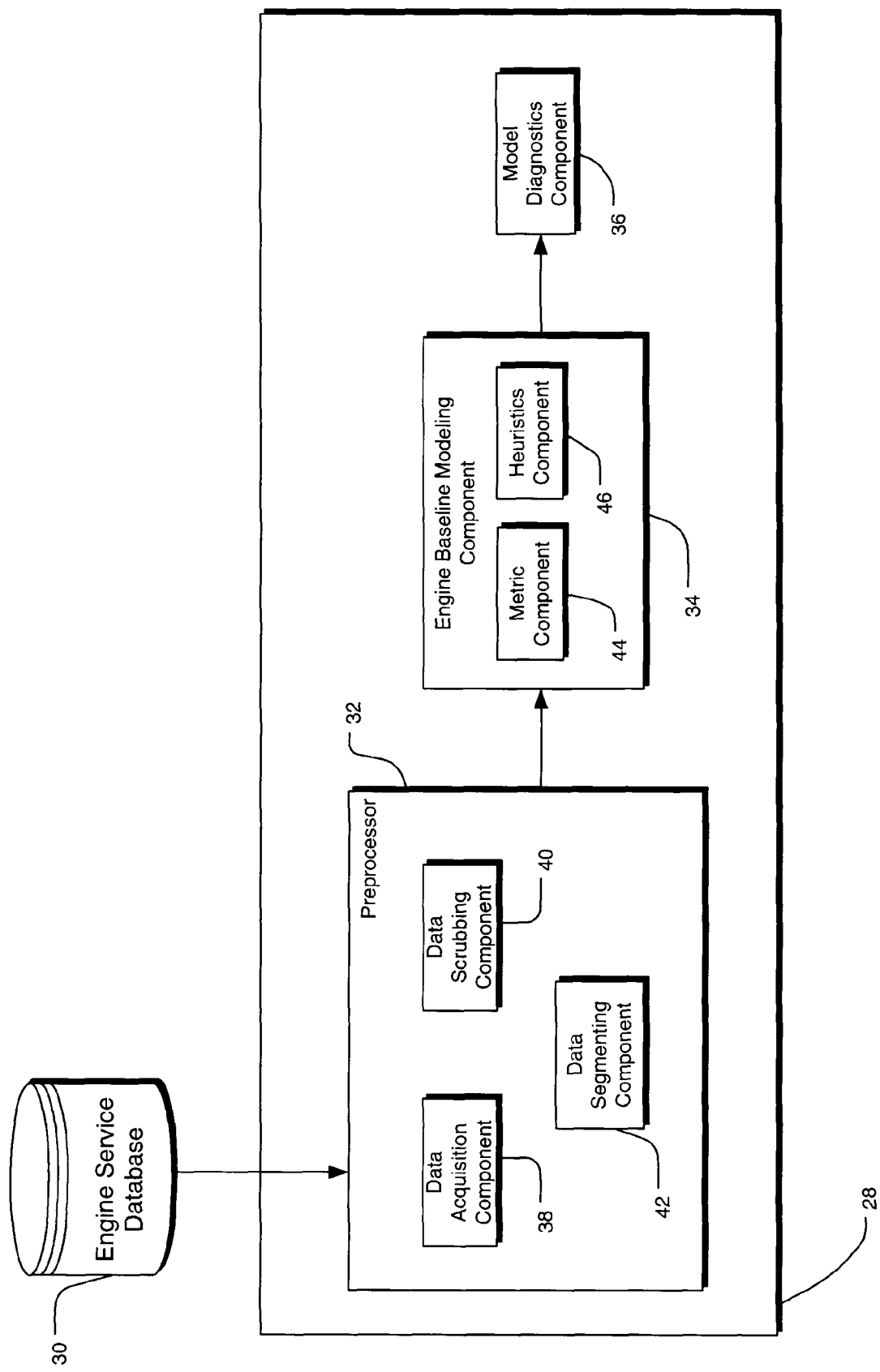
FIG. 2 shows a top-level component architecture diagram of the engine baseline modeling system that operates on the computer system shown in FIG. 1.

FIG. 2 shows a top-level component architecture diagram of an engine baseline modeling system 28 that operates on the computer system 10 shown in FIG. 1. Generally, the engine baseline modeling system 28 models the performance of an "ideal engine for a specified type aircraft engine. An engine baseline model built with the engine baseline modeling system 28 has a multitude of uses. An illustrative, but non-exhaustive list of potential uses for an engine baseline model built from the engine baseline modeling system 28 includes monitoring engine status, predicting future engine behavior, diagnosing engine faults, determining when an engine performs out of specification, determining the quality of an engine and designing new systems for an engine.

In FIG. 2, there is an engine service database 30 that contains engine data for a variety of aircraft engines. The engine data comprises an assortment of engine performance information for each of the engines. Generally, engine performance information includes environmental data in which the engines operate such as altitude, air temperature, air speed, engine loading, engine temperature and pressure. One of ordinary skill in the art will recognize that the engine service database 30 may comprises other engine performance information such as mach, fan speed, etc. In addition, the engine service database 30 may comprise other data such as operational data. A non-exhaustive list of engine operational data stored in the engine service database 30 includes exhaust gas temperatures (EGT), shaft speed between compressors and turbines (Ni and N2), pressure combustion (Pa) and fuel flow (WF). One of ordinary skill in the art will recognize that other engine operational data may include engine bleed settings, vibration readings, and control mechanism settings. Also, the engine service database 30 may comprise other data such as aircraft operating and settings data (e.g., bleed settings).

One of ordinary skill in the art will recognize that there are a variety of approaches to acquiring the above data and storing them in the engine service database 30. For example, some data can be captured automatically using on-line data acquisition techniques, while other data can be captured using manually recording techniques or onboard data capture techniques. Furthermore, the engine service database 30 preferably stores the data in a format that permits users to import the data into other tools for further analysis, such as Microsoft EXCEL®, Minitab, and SAS.

The engine service database 30 may comprise other types of data for the engines. For example, the engine service database 30 may comprise service information for the engines. Generally, the service information will comprise information such as engine product information, age information of the engines and repair history of the engines (e.g., dates of service events, types of service events, etc.). Other types of engine data stored in the engine service database 30 may include in-flight data, engine utilization data (e.g., where, when, how flown), ownership data, remote monitoring and diagnostics status data.

Referring to FIG. 2, the engine baseline modeling system 28 comprises a preprocessor 32 that processes the engine data into a predetermined format. In particular, the preprocessor 32 comprises a data acquisition component 38 that extracts the engine data from the engine service database 30. The data acquisition component 38 acquires the service data by using commercially available modules available from Minitab, Microsoft, Oracle, etc. which directly extract the data into the engine baseline modeling system 28, however, one of ordinary skill in the art will recognize that one can write specialized code to extract the data into a common format and write additional specialized code to import that into the system.

The preprocessor 32 performs computations that simplify future processing of the data, while a data scrubbing component 40 cleans the engine data. In particular, the preprocessor 32 performs operations that convert the data into standard units. For example, the preprocessor 32 can convert temperature data from Celsius to Kelvin or correct engine power setting data by the engine bleed settings. Other types of corrections that the preprocessor 32 may perform include converting pounds to kilograms, altitude to pressure, knots and altitude to mach number. One of ordinary skill in the art will recognize that the listed corrections are only illustrative of some possibilities and are not exhaustive of other possibilities. Furthermore, one of ordinary skill in the art will recognize that the preprocessor 32 can perform the corrections in any manner desired (e.g., Celsius to Rankine) and is not limited to the above order. Examples of cleaning operations performed by the data scrubbing component 40 include discarding data elements with missing values, correcting simple typographical errors, discarding data elements with erroneous values out of reasonable operating range, etc. One of ordinary skill in the art will recognize that the listed cleaning operations are only illustrative of some possibilities and are not exhaustive of other possibilities.

In addition, the preprocessor also comprises a data segmenting component 42 that segments engine data into groups, nodes or clusters that represent similar operating conditions. The groups generally include engine performance variables such as power setting, altitude, air speed (mach number), and air temperature. One of ordinary skill in the art will recognize that other engine performance variables such as air humidity and control settings may be selected and that the disclosure should not be limited to these variables. Once the groups have been selected, then the data segmenting component 42 can segment the data into the particular group that it relates to. Once the data are segmented into the groups, then the data segmenting component 42 can use a cluster analysis to determine clusters of operating conditions. Alternatively, an engineer may assign bands of operations of interest for each of the variables.

An engine baseline modeling component 34 builds an engine baseline model from the data processed by the preprocessor 32. In particular, the engine baseline model built by the engine baseline modeling component relates the selected performance variables as a function of engine operating conditions using the processed data. Engine operating conditions include engine, aircraft and environmental conditions. In this disclosure, the engine baseline model is built from a regression analysis. Generally speaking, a regression is the statistical science of determining an equation from a finite number of points that provides values of Y for a given X, i.e., Y=f(X). In this disclosure, the equation to be determined can be expressed as:

$$Y = f(\text{altitude, temperature, power setting, air speed}) \quad (1)$$

where altitude, temperature, power setting and air speed are the X variables. The engine baseline modeling component 34 performs a regression to determine the above equation for each of the selected engine performance variables (i.e., power setting, altitude, air speed, and air temperature) during specified times that the engine is operating. For instance, the engine modeling component 34 can perform the regression on the data taken during the take-off, climb and cruise for any or all of the engine performance variables. One of ordinary skill in the art will recognize that more engine performance variables (air humidity, control settings, etc.) or less engine performance variables can be used in equation 1. In addition, one of ordinary skill in the art will recognize that different combinations of engine performance variables can be used in equation 1.

In general, a regression fits a parametric equation to a set of data by solving for values of regression parameters such that the best fit to the data set is obtained. Multiple linear regression is a type of regression that solves the system of equations, minimizing the combined error. In this disclosure, the system of equations that the regression solves can be as follows:

$$y[1] = a*\text{power setting}[1] + b*\text{altitude}[1] + c*\text{temperature}[1] + d*\text{airspeed}[1] + \ldots + \text{error}[1]$$

$$y[2] = a*\text{power setting}[2] + b*\text{altitude}[2] + c*\text{temperature}[2] + d*\text{airspeed}[2] + \ldots + \text{error}[2]$$

$$\ldots$$

$$y[n] = a*\text{power setting}[n] + b*\text{altitude}[n] + c*\text{temperature}[n] + d*\text{airspeed}[n] + \ldots + \text{error}[n] \quad (2)$$

wherein a, b, c, d are the regression parameters and power setting[1], altitude[1], temperature[1], airspeed[1], y[1] are observed events. Again, one of ordinary skill in the art will recognize that the system of equations can differ depending on the selection of engine performance variables.

The resulting parameter estimates for a, b, c and d are representative of the new baseline model. Instead of using tables to develop the baseline model as was done in the past, there is now a simple equation that describes the baseline behavior of the engine, from which either the tables may be generated, or the equation can be applied directly. For example, a baseline model for the exhaust gas temperature (EGT) parameter might be as follows:

$$EGT = 0.1*\text{power} + 0.001*\text{altitude} + 0.01*\text{temperature} + 0.05*\text{airspeed} \quad (3)$$

In this example, an engine that had power set to 100, altitude at 1000, temperature at 300, and air speed at 200, would result in a predicted EGT value of 24 degrees, but might have a measured EGT value of 14 degrees, which would indicate that the engine was 10 degrees below the predicted value.

The engine baseline modeling component 34 also comprises a metric component 44 that validates the engine baseline model. In particular, the metric component 44 validates the engine baseline model by examining the quality of the built model. In this disclosure, the metric component 44 determines the goodness of model fit by analyzing statistical goodness of fit metrics, such as R-squared, which is a common regression tool output. One of ordinary skill in the art will recognize that the metric component 44 can determine other metrics besides the R-squared metric such as the mean square error, sum square error and sigma metrics, which are other common regression tool outputs.

The engine baseline modeling component 34 also comprises a data cleaning heuristics component 46 that cleans the preprocessed data according to a set of heuristics. Generally, the data cleaning heuristics component 46 uses heuristics to remove data that does not conform to the norm. An illustrative, but non-exhaustive list of data that the data cleaning heuristics component 46 removes includes regression outliers, regression leverage points, and faulty engines. In this disclosure, this data cleaning operation can be performed for groups of engines or fleets of aircraft that use a common engine.

Additional details and embodiments relating to the engine baseline modeling component 34 will be set forth in detail below. In particular, inventive techniques are provided which additionally enhance the quality and reliability of the generated model.

FIG. 2 also shows that the engine baseline modeling system 28 comprises a model diagnostics component 36 that evaluates the performance of the engine baseline model. In particular, the model diagnostics component 36 generates statistical outputs that provide statistical information to a user of the engine baseline modeling system 28. An illustrative, but non-exhaustive list of the statistical outputs that the model diagnostics component 36 generates includes variance, $r^2$, collinearity, probability plots, residual plots, standard error measurements, confidence limits on the engine baseline model, prediction limits, pure error lack-of-fit test, data subsetting lack-of-fit test, multicolinearity metrics (variance inflation factors), autocorrelation of residuals (Durbin-Watson statistic), etc.

The algorithms performed by the components in the engine baseline modeling system 28 (i.e., the preprocessor 32, engine baseline modeling component 34 and model diagnostics component 36 can be programmed with a commercially available statistical package such as SAS, but other languages such as C or Java may be used.

The engine baseline modeling system 28 is not limited to a software implementation. For instance, the preprocessor 32, engine baseline modeling component 34 and model diagnostics component 36 may take the form of hardware or firmware or combinations of software, hardware, and firmware. In addition, the engine baseline modeling system 28 is not limited to the preprocessor 32, engine baseline modeling component 34 and model diagnostics component 36. One of ordinary skill in the art will recognize that the engine baseline modeling system 28 may have other components.

Figure 3:
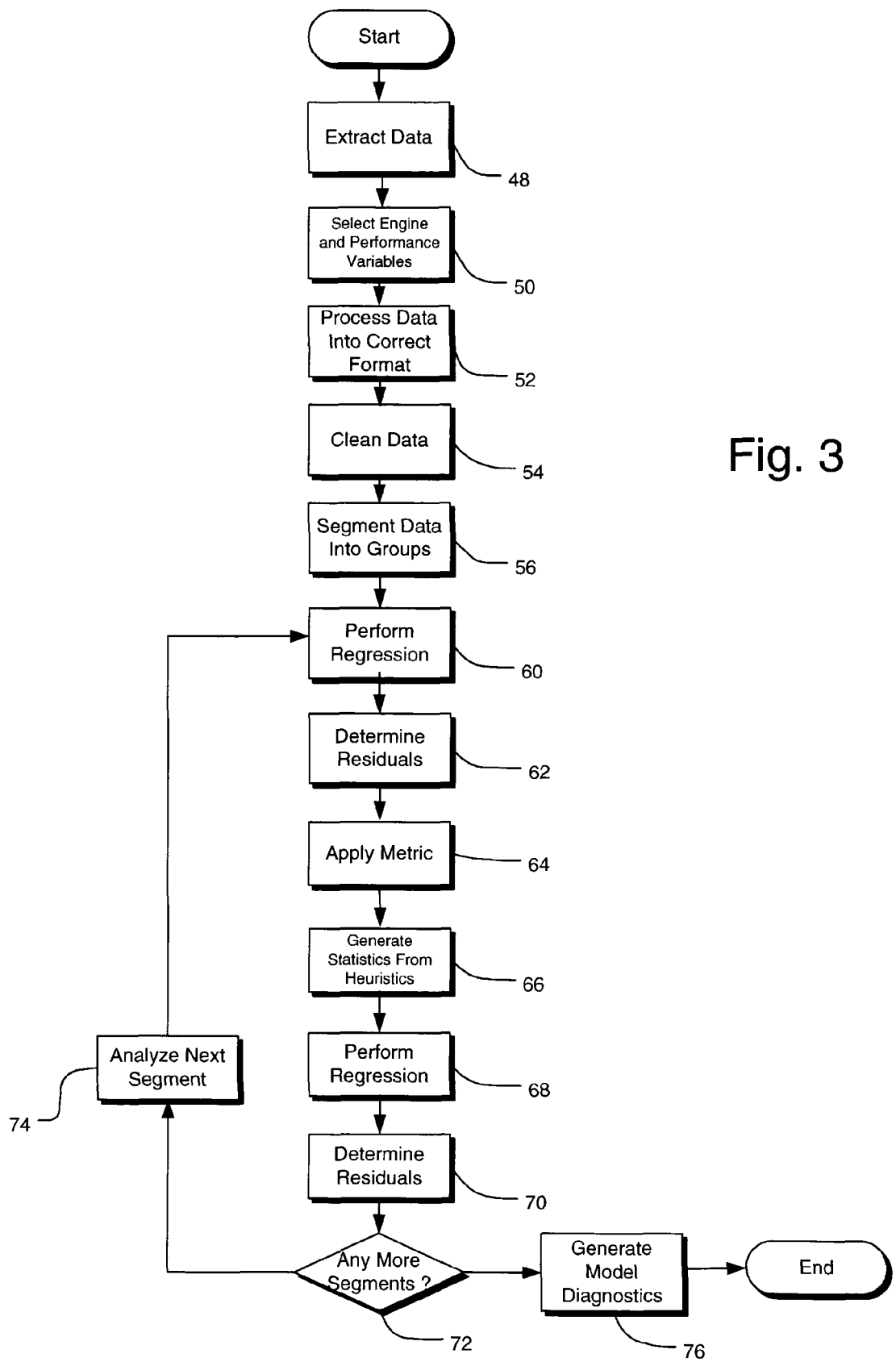
FIG. 3 shows a flow chart describing actions performed by the engine baseline modeling system shown in FIG. 2.

FIG. 3 shows a flow chart describing actions performed by the engine baseline modeling system 28 shown in FIG. 2. At block 48, the data acquisition component 38 extracts the engine data from the engine service database 30. Next, at 50 the user of the engine baseline modeling system 28 selects a particular engine model and engine performance variables for that engine that he or she would like to model (e.g., power setting, altitude, air speed and air temperature). The preprocessor 32 converts data into a standardized format at 52 and the data scrubbing component 40 cleans the engine data at 54. The data segmenting component 42 then segments the engine data into groups such as altitude, air speed and air temperature, fuel specific heat value, air humidity, control settings, etc. at 56.

After the data segmenting component 42 has segmented the engine data into groups, the engine baseline modeling component 34 builds an engine baseline model from the data processed by the preprocessor 32. In particular, the building of the engine baseline model begins with the engine baseline modeling component 34 performing a regression to determine parameters for each of the selected engine performance variables (e.g., altitude, air speed and air temperature) at 60. As mentioned above, the regression relates the engine performance variables as a function of engine operating conditions. The metric component 44 then determines the residuals of the regression at 62 and applies the metrics (e.g., R-square, mean square error, sum square error and sigma metrics) at 64. The term residuals refers to the differences between the actual values of the dependent variables and their predicted or estimated value for a particular observation. Next, the data cleaning heuristics component 46 cleans the preprocessed data according to a set of heuristics and generates certain statistics such as outliers and leverage points at 66.

The engine baseline modeling component 34 then performs another regression at 68. The engine baseline modeling component 34 applies a second regression to improve the parameter estimates by using a cleaner data set. Again, the metric component 44 determines additional residuals at 70. Alternatively, the metric component 44 can generate plots of the residuals if a user desires. At 72, the engine baseline modeling component determines whether there are any more segments that have to be analyzed. If there are more segments, then the next segment is analyzed at 74 and blocks 60-72 are repeated. This process continues until it is determined at 72 that there are no more segments. Once it has been determined that there are no more segments, then the model diagnostics component 36 evaluates the performance of the of the engine baseline model at 76 and generates certain statistical outputs that relate to the model.

The foregoing flow chart of this disclosure shows the functionality and operation of the engine baseline modeling system 28. In this regard, each block represents a module, segment, or portion of code, which comprises one or more executable instructions for implementing the specified logical function(s). It should also be noted that in some alternative implementations, the functions noted in the blocks may occur out of the order noted in the figures or, for example, may in fact be executed substantially concurrently or in the reverse order, depending upon the functionality involved. Furthermore, the functions can be implemented in programming languages such as C and Java, however, other computer programming languages can be used. Also, the engine service database 30 may be constructed using commercial databases including standard relational, object-oriented or hierarchical databases. Data manipulation operations, including retrieval, creation, modification, and deletion, can be implemented within the programming languages or within the database using stored procedures or triggers or combinations.

The above-described engine baseline modeling system 28 comprises an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

Figure 4:
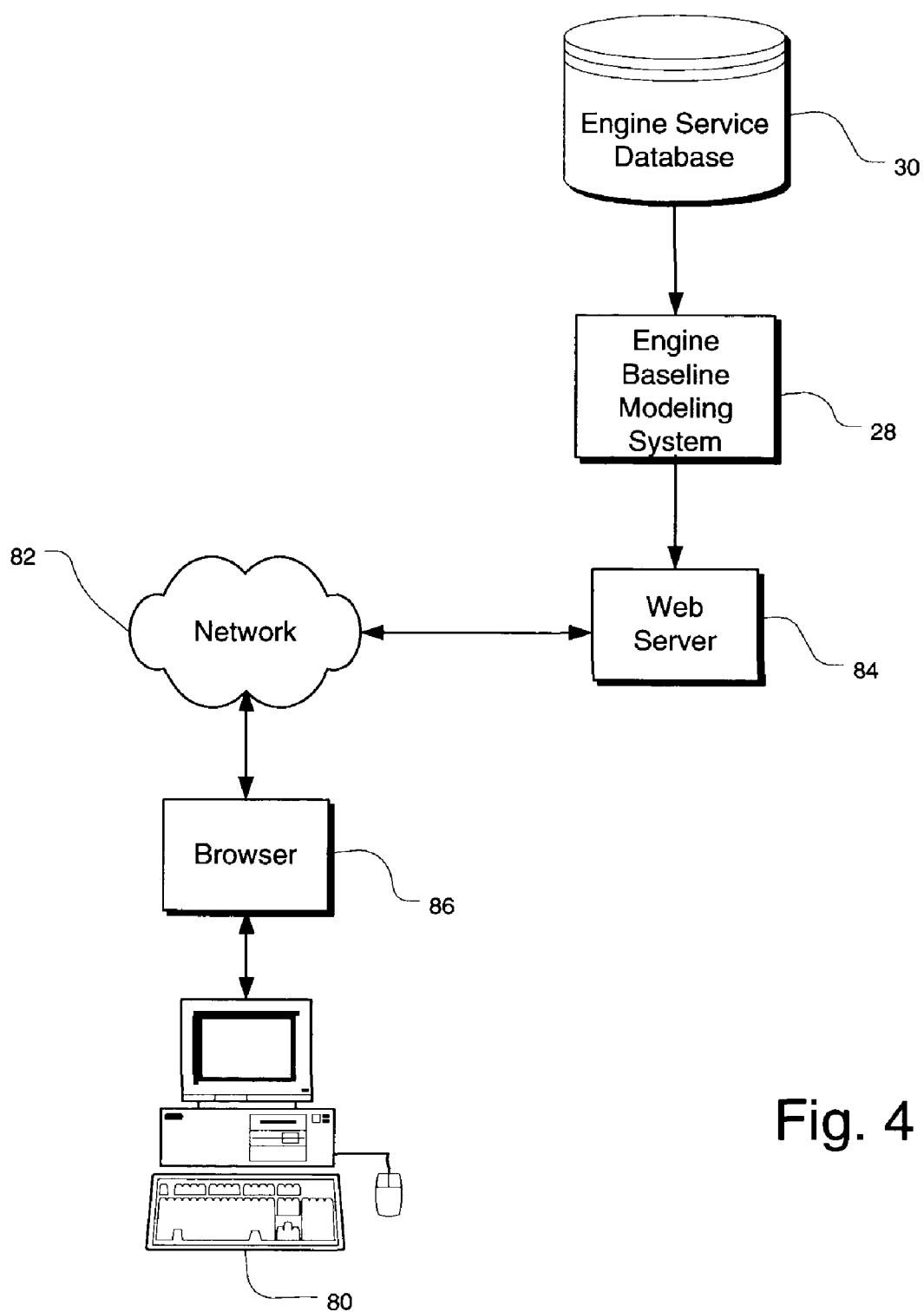
FIG. 4 shows an architectural diagram of a system for implementing the engine baseline modeling system shown in FIG. 2.

FIG. 4 shows an architectural diagram of a system 78 for implementing the engine baseline modeling system 28 shown in FIG. 2 in a networked environment. In FIG. 4, a user uses a computing unit 80 to access the engine baseline modeling system 28 and engine service database 30. More specifically, the computing unit 80 connects to the engine baseline modeling system 28 and engine service database 30 through a communication network 82 such as an electronic or wireless network. The computing unit 80 can take the form of a handheld digital computer, personal digital assistant computer, notebook computer, personal computer or workstation, while the communications network may be a private network such as an extranet or intranet or a global network such as a WAN (e.g., Internet). A web server 84 serves the engine baseline modeling system 28 and the engine service database 30 to the user in the form of web pages. The web pages can be in the form of HTML, however, other formats and structures can be used such as SGML, XML or XHTML. The user uses a web browser 86 running on the computing unit 80 such as Microsoft INTERNET EXPLORER, Netscape NAVIGATOR or Mosaic to locate and display the web pages generated from the engine baseline modeling system 28 and engine service database 30.

If desired, the system 78 may have functionality that enables authentication and access control of users accessing the web pages linked to the engine baseline modeling system 28. Both authentication and access control can be handled at the web server level by a commercially available package such as Netegrity SITEMINDER. Information to enable authentication and access control such as the user names, location, telephone number, organization, login identification, password, access privileges to certain resources, physical devices in the network, services available to physical devices, etc. can be retained in a database directory. The database directory can take the form of a lightweight directory access protocol (LDAP) database, however, other directory type databases with other types of schema may be used including relational databases, object-oriented databases, flat files, or other data management systems.

Figure 5:
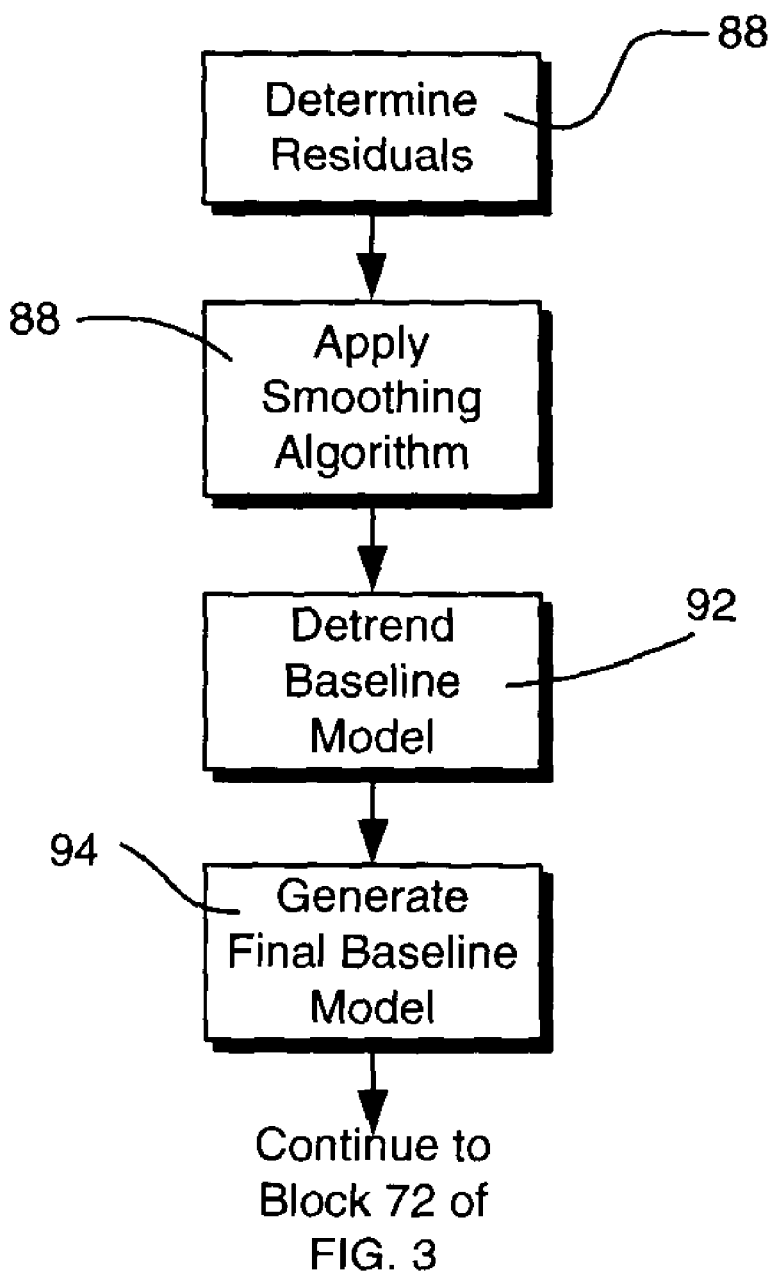
FIG. 5 is a flow chart describing an alternative embodiment of actions performed by the engine baseline modeling system shown in FIG. 2.

Referring now to FIG. 5, there is shown a flow diagram illustrating a second alternative embodiment of the engine baseline modeling component 34 as described in blocks 60 through 72 of FIG. 3. In particular, the engine baseline modeling component 34 may be further configured to adjust the output baseline model for time varying effects on the measured/modeled data and parameters. It should be understood that various ones of the measured types of engine data include time-based variations or deteriorations which are expected or normal during the operation of the engine. That is, as time moves forward, data values may change to a known degree solely in relation to time, and not due to other external considerations or poor operation. In order to further enhance the quality of the baseline model, such time-related deterioration effects should be removed from the baseline model.

In the first embodiment described above, an assumption is made regarding the effect of time on measured trends, in that deterioration time effects (i.e., trend variations) over short periods are deemed to be much smaller than the measured residuals, thereby rendering their effect minimal. However, if deterioration time effects are not assumed to be small relative to residuals, less effective models may be generated. Accordingly, the present invention includes a method for reducing the effect of such deterioration, thereby increasing the usefulness of the generated baseline.

In block 88 of FIG. 5, residual values are again calculated as in block 70 of FIG. 3, above, creating an initial baseline model. Next, in block 90, the initial baseline model is subjected to a smoothing algorithm, such as a moving average, to reduce variations in the identified trends. Once the initial model has been smoothed, the smoothed effect may then be eliminated from the initial baseline model in 92, thereby removing its effect on the measured residuals. Essentially, by smoothing the initial model to remove or reduce trend variations, the remaining model represents only the deterioration time effects on the measured parameter. Once these effects are isolated, they may be removed from the initial model through a process known as detrending. Once detrended, a new baseline model may be calculated in block 94. The process then continues to block 72 of FIG. 3, where it is determined whether additional segments remain to be analyzed.

It should be understood that any suitable method for smoothing variations on the initial baseline model may be applied and should not be limited to the moving average methodology described above. In one embodiment, a Loess algorithm may be employed. Additionally, in another embodiment of the present invention, the steps of blocks 90-94 may be repeated to further improve the quality of the baseline model. However, it should be noted that each subsequent iteration of the smoothing and detrending process results in diminished improvement on model quality.

Figure 6:
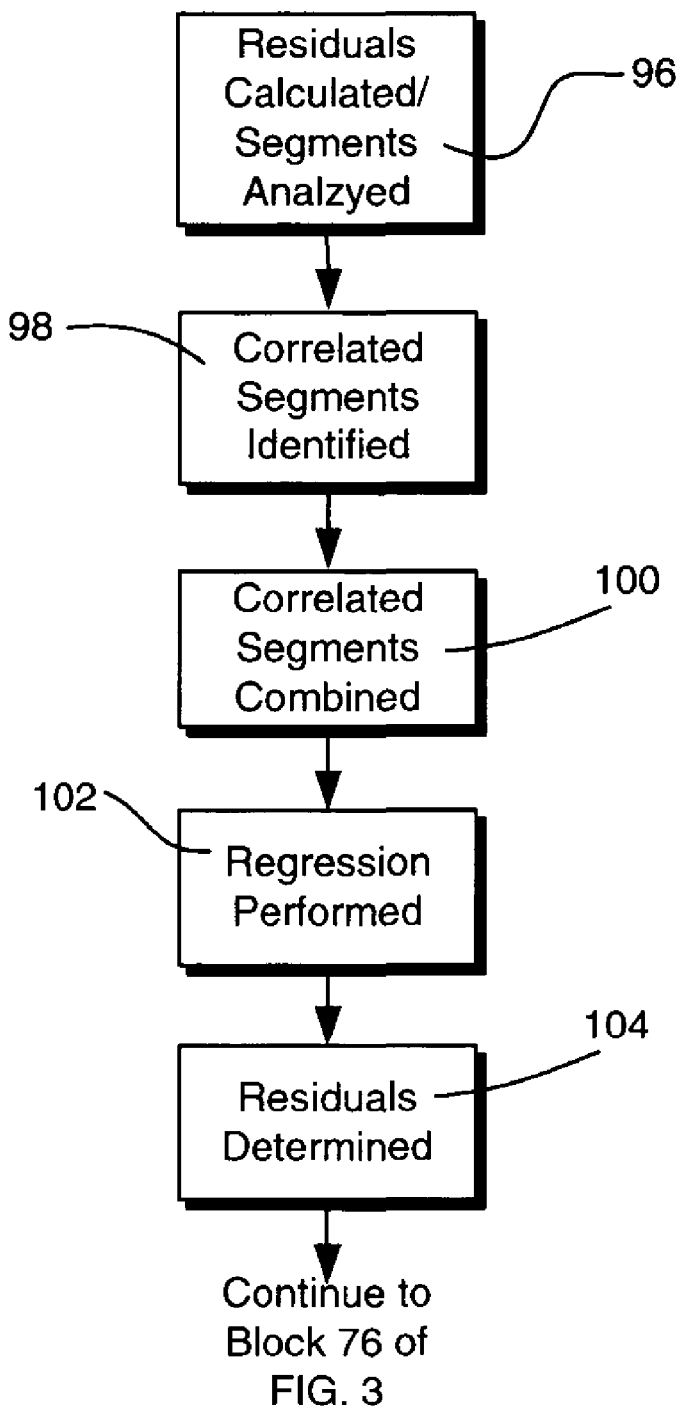
FIG. 6 is a flow chart describing another alternative embodiment of actions performed by the engine baseline modeling system shown in FIG. 2.

Referring now to FIG. 6, there is shown a flow diagram illustrating a third alternative embodiment of the engine baseline modeling component 34 as described above in blocks 60 through 72 of FIG. 3. In particular, the engine baseline modeling component 34 may be further configured to adjust the output baseline model to include modeling data for various combined parameters. Although each measured type of engine data relates to specific condition or mechanism, correlations between various data types can be ascertained. Accordingly, resulting trends from correlated data types may be combined to reduce the effect of noise in the overall model, while preserving the important characteristics of the results.

In block 96 of FIG. 6, residual values are again calculated and all data segments are analyzed, as determined in block 72 of FIG. 3. At this point, correlated segments are identified in block 98. The data from these segments is then combined or fused in block 100. In one embodiment, this data fusion process utilizes a technique known as weighted average.

In this technique, a normalizing transform is performed on each data set. Once the identified data sets have been normalized, a trend is determined for each of the monitored parameters in block. One trend is selected as the primary trend and the remaining trends are fit to the primary trend. This may be accomplished in any suitable manner, such as regression or data smoothing techniques. By way of explanation, in one particular embodiment, three exemplary trends B (blue), G (green), and R (red) have been identified for monitored parameters. Assuming that the blue (B) trend has been established as the primary trend, the R and G trends are then fit to the primary B trend. This may be done by fitting the models, $B[i]=a1*R[i]+b1$ and $B[i]=a2*G[i]+b2$. New R and G datasets are then generated from $R*[i]=a1*R[i]+b1$ and $G*[i]=a2*G[i]+b2$.

If the models fit well, then BLUE[i], RED*[i], and GREEN*[i] should all be approximately the same value, where Red and Green have been normalized to fit the primary Blue trend. In this manner, 3 times as many observations are utilized in a single dataset than would have been utilized by just using the BLUE series alone. Accordingly, the final model is then based upon more information.

Of course, since the data isn't always as nice as the example, circumstances exist wherein different trend data is not combined together in this manner. For example, fluctuations in one trend that doesn't occur in the other two may be ignored. Additionally, the smoothing concept briefly described above comes into play when the R, G, B trends are less than perfect, and may include significant amounts of noise. By smoothing, with a moving average for example, smooth trends R', G', B', may be identified. In one embodiment, $B'[i]=a1*R'[i]+b1$ and $B'[i]=a2*G'[i]+b2$, may be utilized to generate a smoothed B' trend. New R and G datasets are then generated as before. This technique is particularly useful when measuring the same quantity, such as fuel flow or exhaust gas temperature, at different operational points, such as aircraft cruise (steady state), takeoff (maximum transient), and climb (maximum sustained).

Next, once normalized, data sets are combined to form a single data set, effectively representing a new engine parameter relating to engine performance. Once the data has been combined, a regression on the combined data is performed in 102 and the residuals are determined in block 104, resulting in a baseline model for the combined parameters, which may be a better indicator of engine performance, thereby enabling more rapid and accurate monitoring and diagnosis. The process then continues to model diagnostics generation block 76, described in FIG. 3.

Figure 7:
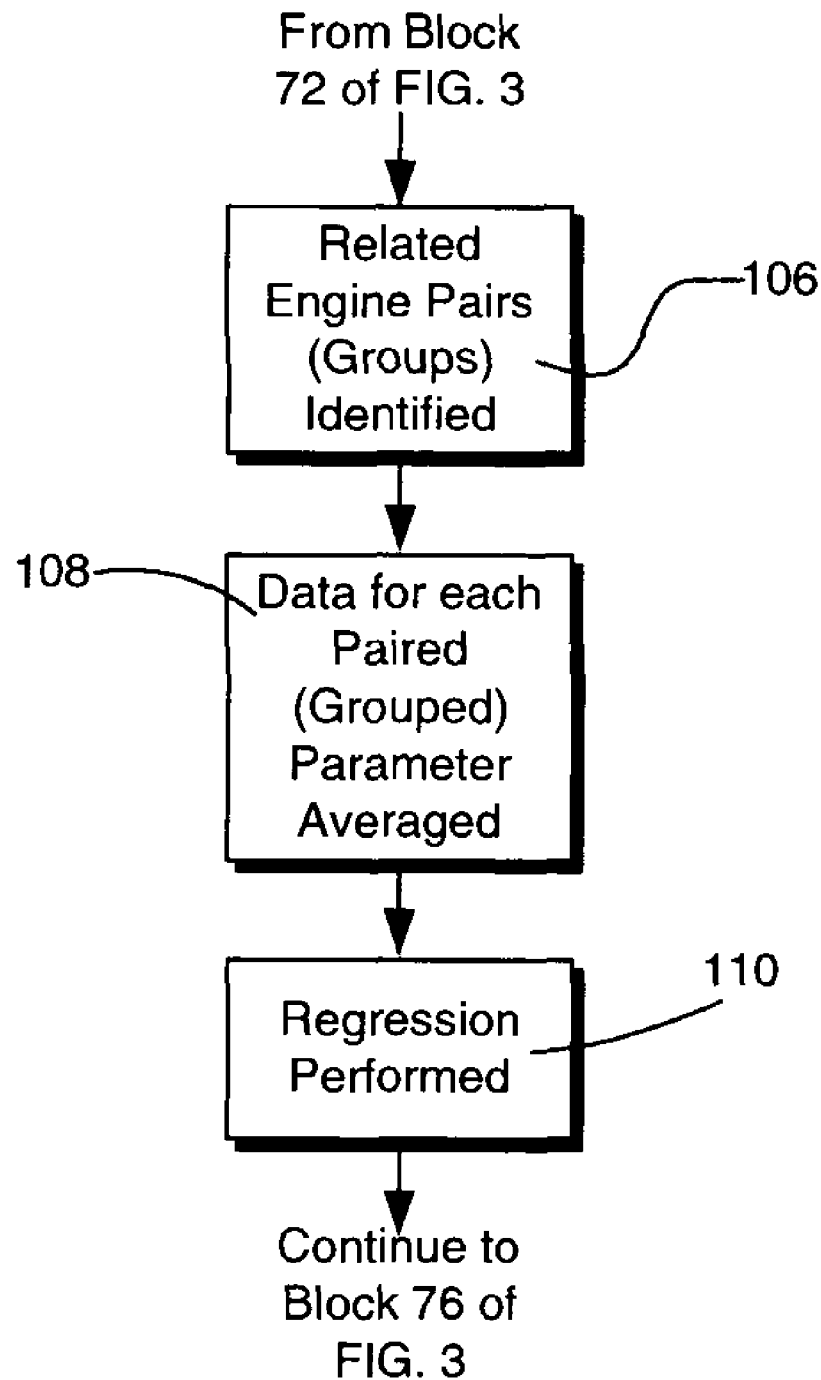
FIG. 7 is a flow chart describing yet another alternative embodiment of actions performed by the engine baseline modeling system shown in FIG. 2.

Referring now to FIG. 7, there is shown a flow diagram illustrating a fourth alternative embodiment of the engine baseline modeling component 34 as described above in blocks 60 through 72 of FIG. 3. In particular, the engine baseline modeling component 34 may be further configured to develop baseline models for pairs or other groupings of engines. Because engines are rarely used alone, it may be desirable to develop baseline models for pairs of engines which will be used together, since paired systems operate under the same environment. Further, because the average output of engine pairs is tied to their average input, it is determined that the model for the entire system may be more accurate if operational conditions and outputs of the paired system as a whole are considered.

Initially, in block 106, once all data segments have been initially analyzed in step 72 of FIG. 3, information from related pairs of engines are identified. Next, the data calculated for each paired value is averaged in step 108. In step 110, the averaged data is included within another regression analysis to further reduce estimation error in the diagnosis, thereby resulting in a more accurate baseline model. One form of doing this is to simply modify model equation (1) recited above from:

$$Y = f(\text{altitude, temperature, power setting, air speed}) \quad (1)$$

,to $$Y = f(\text{altitude, temperature, power setting, air speed, power setting other engine}), \quad (4)$$

since the other 3 elements remain constant for both engines. A more complex manner of performing this regression is to also add the previous Y result from the other engine:

$$Y = f(\text{atitude, temperature, power setting, air speed, power setting other engine, } Y \text{ other engine}) \quad (5)$$

In this manner, the present methodology man be extended to 3 and 4 engine aircraft as well as the above described two engine embodiment.

It is apparent that there has been provided in accordance with this invention, a baseline modeling system, method and computer product. While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

The invention claimed is:

1. A system for performing engine baseline modeling, comprising:
    an engine service database containing engine data, wherein the engine data includes at least time-varying engine data;
    a preprocessor for processing the engine data into a predetermined format;
    an engine baseline modeling component that builds an initial engine baseline model from the preprocessed data using a regression analysis, wherein the regression analysis relates engine performance variables as a function of engine operating conditions,
    wherein the engine baseline modeling component:
        applies a smoothing algorithm to the initial engine baseline model to generate a smoothed effect,
        eliminates the smoothed effect from the initial engine baseline model to isolate a plurality of deterioration time effects on a measured parameter, and
        removes the deterioration time effects from the initial engine baseline model to generate a detrended engine baseline model; and
    a model diagnostic component that evaluates the performance of the detrended engine baseline model.

2. The system of claim 1, wherein the smoothing algorithm includes a moving average calculation.

3. The system of claim 1, further comprising the engine baseline modeling component performing repeated applications of the smoothing algorithm to the detrended engine baseline model.

4. The system of claim 1, wherein the preprocessor comprises a data acquisition component that extracts the engine data from the engine services database.

5. The system of claim 1, wherein the preprocessor comprises a data scrubbing component that cleans the engine data.

6. The system of claim 1, wherein the preprocessor comprises a data segmenting component that segments the engine data into a plurality of groups.

7. The system of claim 1, wherein the engine baseline modeling component comprises a metric component that validates the detrended engine baseline model.

8. The system of claim 1, wherein the engine baseline modeling component comprises a heuristics component that generates rules for cleaning the preprocessed data.

9. A system for performing engine baseline modeling, comprising:
    an engine service database containing engine data;
    a preprocessor for processing the engine data into a predetermined format, wherein the preprocessor comprises a data segmenting component that segments the engine data into a plurality of groups;
    an engine baseline modeling component that builds an initial engine baseline model from the preprocessed data using a regression analysis, wherein the regression analysis relates engine performance variables as a function of engine operating conditions,
    wherein the engine baseline modeling component identifies correlated groups of engine data based upon the initial engine baseline model,
    wherein the engine baseline modeling component combines data from correlated groups, and
    wherein the engine baseline modeling component builds a final engine baseline model from the combined data using a regression analysis; and
    a model diagnostic component that evaluates the performance of the final engine baseline model.

10. The system of claim 9, wherein the combination of data from correlated groups is performed by utilizing a weighted average technique to fit all engine baseline parameter trends to one primary trend.

11. A system for performing engine baseline modeling, comprising:
an engine service database containing engine data;
a preprocessor for processing the engine data into a predetermined format, wherein the preprocessor comprises a data segmenting component that segments the engine data into a plurality of groups;
an engine baseline modeling component that builds an initial engine baseline model from the preprocessed data using a regression analysis, the initial engine baseline model represented by a plurality of parameter estimates, wherein the regression analysis relates engine performance variables as a function of engine operating conditions,
wherein the engine baseline modeling component identifies segments relating to related engines,
wherein the engine baseline modeling component smoothes the parameter estimates for each of the identified related engine segments, and
wherein the engine baseline modeling component builds a final engine baseline model from the averaged data using a regression analysis; and
a model diagnostic component that evaluates the performance of the final engine baseline model.

12. A method for performing engine baseline modeling, comprising:
storing engine data in an engine service database, wherein the engine data includes at least time-varying engine data;
processing the engine data into a predetermined format;
building an initial engine baseline model from the processed data using a regression analysis, wherein the regression analysis relates engine performance variables as a function of engine operating conditions,
applying a smoothing algorithm to the initial engine baseline model to generate a smoothed effect;
eliminating the smoothed effect from the initial engine baseline model to isolate a plurality of deterioration time effects on a measured parameter; and
removing the deterioration time effects from the initial engine baseline model to generate a detrended engine baseline model; and
using the detrended baseline model to perform at least one of monitoring engine status, predicting future engine behavior, diagnosing engine faults, determining engine performance, determining engine quality and designing new engine systems.

13. The method of claim 12, wherein the smoothing algorithm includes a moving average calculation.

14. The method of claim 12, further comprising repeatedly applying the smoothing algorithm to the detrended engine baseline model.

15. The method of claim 12, further comprising extracting the engine data from the engine services database.

16. The method of claim 12, wherein the processing step further comprises cleaning the engine data.

17. The method of claim 12, wherein the processing step further comprises segmenting the engine data into a plurality of groups.

18. The method of claim 12, further comprising validating the detrended engine baseline model.

19. The method of claim 12, further comprising generating rules for cleaning the preprocessed data.

20. The method of claim 12, further comprising evaluating the performance of the detrended engine baseline model.

21. A method for performing engine baseline modeling, comprising:
storing engine data in an engine service database;
processing the engine data into a predetermined format;
segmenting the engine data into a plurality of groups;
building an initial engine baseline model from the processed data using a regression analysis, wherein the regression analysis relates engine performance variables as a function of engine operating conditions;
identifying correlated groups of engine data based upon the initial engine baseline model;
combining data from correlated groups;
building a final engine baseline model from the combined data using a regression analysis; and
using the final engine baseline model to perform at least one of monitoring engine status, predicting future engine behavior, diagnosing engine faults, determining engine performance, determining engine quality and designing new engine systems.

22. The method of claim 21, wherein the step of combining of data from correlated groups comprises utilizing a weighted average technique to fit all engine baseline parameter trends to one primary trend.

23. A method for performing engine baseline modeling, comprising:
storing engine data in an engine service database;
processing the engine data into a predetermined format;
segmenting the engine data into a plurality of groups;
building an initial engine baseline model from the processed data using a regression analysis, the initial engine baseline model represented by a plurality of parameter estimates, wherein the regression analysis relates engine performance variables as a function of engine operating conditions;
identifying segments relating to related engines;
smoothing the parameter estimates for each of the identified related engine segments;
building a final engine baseline model from the averaged data using a regression analysis; and
using the final engine baseline model to perform at least one of monitoring engine status, predicting future engine behavior, diagnosing engine faults, determining engine performance, determining engine quality and designing new engine systems.

24. A computer-readable medium storing computer instructions for instructing a computer system to perform engine baseline modeling, the computer instructions comprising:
one or more instructions for storing engine data in an engine service database, wherein the engine data includes at least time-varying engine data;
one or more instructions for processing the engine data into a predetermined format;
one or more instructions for building an initial engine baseline model from the processed data using a regression analysis, wherein the regression analysis relates engine performance variables as a function of engine operating conditions;
one or more instructions for applying a smoothing algorithm to the initial engine baseline model to generate a smoothed effect;
one or more instructions for eliminating the smoothed effect from the initial engine baseline model to isolate a plurality of deterioration time effects on a measured parameter; and one or more instructions for removing the deterioration time effects from the initial engine baseline model to generate a detrended engine baseline model; and one or more instructions for using the detrended baseline model to perform at least one of monitoring engine status, predicting future engine behavior, diagnosing engine faults, determining engine performance, determining engine quality and designing new engine systems.

25. The computer-readable medium of claim 24, wherein the smoothing algorithm includes a moving average calculation.

26. The computer-readable medium of claim 24, further comprising one or more instructions for repeatedly applying the smoothing algorithm to the detrended engine baseline model.

27. The computer-readable medium of claim 24, further comprising one or more instructions for extracting the engine data from the engine services database.

28. The computer-readable medium of claim 24, wherein the one or more instructions for processing further comprise one or more instructions for cleaning the engine data.

29. The computer-readable medium of claim 24, wherein the one or more instructions for processing further comprise one or more instructions for segmenting the engine data into a plurality of groups.

30. The computer-readable medium of claim 24, further comprising one or more instructions for validating the detrended engine baseline model.

31. The computer-readable medium of claim 24, further comprising one or more instructions for generating rules for cleaning the preprocessed data.

32. The computer-readable medium of claim 24, further comprising one or more instructions for evaluating the performance of the detrended engine baseline model.

33. A computer-readable medium storing computer instructions for instructing a computer system to perform engine baseline modeling, the computer instructions comprising:

one or more instructions for storing engine data in an engine service database;

one or more instructions for processing the engine data into a predetermined format;

one or more instructions for segmenting the engine data into a plurality of groups;

one or more instructions for building an initial engine baseline model from the processed data using a regression analysis, wherein the regression analysis relates engine performance variables as a function of engine operating conditions;

one or more instructions for identifying correlated groups of engine data based upon the initial engine baseline model;

one or more instructions for combining data from correlated groups;

one or more instructions for building a final engine baseline model from the combined data using a regression analysis, and one or more instructions for using the final engine baseline model to perform at least one of monitoring engine status, predicting future engine behavior, diagnosing engine faults, determining engine performance, determining engine quality and designing new engine systems.

34. The computer-readable medium of claim 21, wherein the one or more instructions for combining data from correlated groups comprises one or more instructions for applying a weighted average technique to fit all engine baseline parameter trends to one primary trend.

35. A computer-readable medium storing computer instructions for instructing a computer system to perform engine baseline modeling, the computer instructions comprising:

one or more instructions for storing engine data in an engine service database;

one or more instructions for processing the engine data into a predetermined format;

one or more instructions for segmenting the engine data into a plurality of groups;

one or more instructions for building an initial engine baseline model from the processed data using a regression analysis, the initial engine baseline model represented by a plurality of parameter estimates, wherein the regression analysis relates engine performance variables as a function of engine operating conditions;

one or more instructions for identifying segments relating to related engines;

one or more instructions for smoothing the parameter estimates for each of the identified related engine segments;

one or more instructions for building a final engine baseline model from the averaged data using a regression analysis, and one or more instructions for using the final engine baseline model to perform at least one of monitoring engine status, predicting future engine behavior, diagnosing engine faults, determining engine performance, determining engine quality and designing new engine systems.

* * * * *